United States Patent
Huang et al.

(10) Patent No.: US 7,193,659 B2
(45) Date of Patent: Mar. 20, 2007

(54) METHOD AND APPARATUS FOR COMPENSATING FOR CHROMINANCE SATURATION

(75) Inventors: Yong Huang, Singapore (SG); Patricia Wei Yin Chiang, Singapore (SG); Lucas Y. W. Hui, Singapore (SG); Kwong Huang Goh, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 453 days.

(21) Appl. No.: 10/847,205

(22) Filed: May 17, 2004

(65) Prior Publication Data
US 2005/0007497 A1 Jan. 13, 2005

(30) Foreign Application Priority Data
May 17, 2003 (SG) .............................. 200303347-9

(51) Int. Cl.
*H04N 9/68* (2006.01)
*H04N 9/64* (2006.01)

(52) U.S. Cl. ...................... 348/649; 348/645; 348/631; 348/703

(58) Field of Classification Search ................ 348/645, 348/646, 649, 651, 654, 712, 713, 631, 703; *H04N 9/68, H04N 9/64*
See application file for complete search history.

(56) References Cited

U.S. PATENT DOCUMENTS

| 4,679,072 | A | * | 7/1987 | Takayama | 348/645 |
| 6,026,179 | A | * | 2/2000 | Brett | 348/649 |
| 6,163,346 | A | * | 12/2000 | Tsyrganovich | 348/649 |

* cited by examiner

*Primary Examiner*—Sherrie Hsia
(74) *Attorney, Agent, or Firm*—Lisa K. Jorgenson; Robert Iannucci; Seed IP Law Group PLLC

(57) ABSTRACT

A method of color saturation compensation in a video signal is disclosed. The method includes the steps of: processing a luminance signal component of the video signal; determining whether the processing of the luminance signal results in a change in chrominance saturation; if the step of determining reveals that the chrominance saturation has changed, applying a chrominance compensation signal to the chrominance signals to counteract the effects of chrominance saturation, wherein the step of applying a compensation signal include the steps of: generating a compensation signal which is dependent on hue and luminance ratio (output luminance signal/input luminance signal). Apparatus for performing the method is also disclosed.

24 Claims, 7 Drawing Sheets

| Region | Angle Range | Quotients | Sign | | | Hue |
|---|---|---|---|---|---|---|
| | | | Cb | Cr | Cb-Cr | |
| 1 | 0-45 | 0-45 | 0 | 0 | 0 | 0+Quotient |
| 2 | 45-90 | 45-0 | 0 | 0 | 1 | 90-Quotient |
| 3 | 90-135 | 0-45 | 1 | 0 | 1 | 90+Quotient |
| 4 | 135-180 | 45-0 | 1 | 0 | 0 | 180-Quotient |
| 5 | 180-225 | 0-45 | 1 | 1 | 0 | 180+Quotient |
| 6 | 225-270 | 45-0 | 1 | 1 | 1 | 270-Quotient |
| 7 | 270-315 | 0-45 | 0 | 1 | 1 | 270+Quotient |
| 8 | 315-360 | 45-0 | 0 | 1 | 0 | 360-Quotient |

| Line segments | Hue ranges | Slopes (K(L)) | Offsets (B(L)) |
|---|---|---|---|
| L1 | 0-52 | -0.0014 | 1.2314 |
| L2 | 53-100 | 0.0002 | 1.1525 |
| L3 | 101-177 | -0.0028 | 1.4797 |
| L4 | 178-235 | 0.0015 | 0.7513 |
| L5 | 236-280 | -0.0003 | 1.1637 |
| L6 | 281-360 | 0.0023 | 0.4163 |

METHOD AND APPARATUS FOR COMPENSATING FOR CHROMINANCE SATURATION

The present invention relates to a method and apparatus for use in video processing systems to compensate for colour saturation, particularly after luminance processing has been performed.

BACKGROUND TO THE INVENTION

The human eye is able to interpret very many different colours. Colour may be considered to be the combined effect of three distinct components or properties of light: hue, saturation and brightness. Hue is the name of the colour, and places the colour in its correct position in the electromagnetic spectrum. Saturation is the degree of intensity, or strength, of a colour. Brightness describes differences in the intensity of light reflected from, or, transmitted by, a colour image.

In colour television systems, video signals are represented by three components: Y (luminance), and two chrominance components (Cb, Cr). The signal is thus referred to as YCbCr. The luminance component (Y) contains the brightness information, and the chrominance components (Cb, Cr) contain the colour information.

The YCbCr system is defined in CCIR601, which relates to a worldwide digital video standard. In an 8-bit digital system, Y has a normal range of 16 to 235, and Cb and Cr have a range of 16 to 240, with 128 equalling 0.

The YCbCr colour space is represented graphically in FIG. 1. The values of Y, Cb and Cr are shown without the offsets described above i.e. the range of Y is 0 to 219, and the range of Cb and Cr is -112 to 112. In the colour space as illustrated, the hue is represented by the phase angle with respect to the Cb axis. The magnitude of the chrominance components vector, in combination with the luminance Y, provides a measure for colour saturation

DESCRIPTION OF THE PRIOR ART

In prior art video processing systems, many quality enhancements are applied to the luminance component. Linear and non-linear mapping functions are applied to the raw luminance signal to yield an improved luminance value and so, an improved picture. However, this process leads to a perceptual change in the viewed colour saturation. This can result in images which are not optimal. Prior art compensation systems operate by adjusting the gain of the chrominance signals to offset the change in colour saturation. Specific solutions use the change in gain in the luminance signal to derive a corresponding change in the gain to the chrominance signals.

Image quality improvement by linear or non-linear processing of the luminance signal leads to a noticeable change in the output colour saturation, which directly affects the quality of the viewed image. Increasing the luminance signal alone results in a decreased colour saturation rendering viewed colours somewhat pastel in appearance. Decreasing the luminance signal alone results in increased colour saturation rendering viewed colours more unnaturally vivid, which in some cases can appear over-saturated and uncomfortable to watch.

The problem with adjusting image quality by processing the luminance component alone means that a degree of post processing of the chrominance signals is generally required in order to compensate for colour saturation changes.

FIG. 2 shows a prior art solution to the problem of processing the luminance component. The input luminance signal $Y_{in}$ is received by a luminance processor 101, which outputs a processed luminance signal $Y_{out}$. $Y_{in}$ and $Y_{out}$ are also fed into a gain generator 102 which determines the amount of gain applied to $Y_{in}$ and adjusts the input chrominance signals $Cb_{in}$ and $Cr_{in}$ accordingly, in multipliers 103 and 104, respectively, to yield $Cb_{out}$ and $Cr_{out}$.

A problem with such a compensation system is that it does not account for human perceptions of different hues, and treats all hues equally.

The present invention aims to provide a method and apparatus which addresses and ameliorates the problems described above.

SUMMARY OF THE INVENTION

According to the present invention, there is provided a method of colour saturation compensation in a video signal, including the steps of: processing a luminance signal component of the video signal; determining whether the processing of the luminance signal results in a change in chrominance saturation; if the step of determining reveals that the chrominance saturation has changed, applying a chrominance compensation signal to the chrominance signals to counteract the effects of chrominance saturation, wherein said step of applying a compensation signal include the steps of: generating a compensation signal which is dependent on hue and luminance ratio (output luminance signal/input luminance signal).

Preferably, said hue is determined according to the relationship:

$$\text{Hue} = \tan^{-1}(Cr_{in}/Cb_{in})$$

where $Cr_{in}$ and $Cb_{in}$ are the input chrominance signals.

Preferably, the hue may be approximated by the following steps: dividing the absolute value of the smaller of $Cr_{in}$ and $Cb_{in}$ by the larger of $Cr_{in}$ and $Cb_{in}$; determining in which of eight 45° regions of CbCr space a present sample resides by processing sign bits of Cb, Cr and the difference between the absolute values of Cb and Cr; limiting the resultant value such that it lies in the range 0 to 360 as a valid hue.

Preferably, the smaller of the absolute value of Cb or Cr is divided by the larger of the absolute value of Cb or Cr, wherein the result of the division is processed such that the result of the division process is augmented such that it lies in the correct region according to the sign of Cb, the sign of Cr and the sign of |Cb|-|Cr|.

Preferably, the compensation signal is derived from hue information, said hue information forming an input to a weighting factor calculation process which calculates a weighting factor for a particular hue, said weighting factor being multiplied by the luminance ratio to yield the compensation signal.

Preferably, said compensation signal is constrained so a not to exceed a maximum allowable gain.

Preferably, said weighting factor calculation process includes calculating a weighting factor described a linear approximation to a non-linear function.

Preferably, the linear approximation takes the form of a plurality of line segments defining a relationship between hue and weighting factor.

Preferably, the plurality of line segments includes six discrete line segments having relating hue to weight according to the table of FIG. 14.

Preferably, the weighting factor may be modified by an amount determined by a user-defined quantity.

According to a second aspect of the present invention, there is provided apparatus to perform the method and associated features of the first aspect of the present invention.

Embodiments of the present invention apply a compensation gain to modify the chrominance components, Cb and Cr, based on a particular hue. Embodiments are able to compensate colour saturation on both over-saturated and de-saturated cases.

In a preferred embodiment, the hue-based compensation gain signal is obtained by multiplying the ratio of the output and input luminance with a hue-based weighting factor which varies depending on the hue. The hue-based weighting factor is indicative of the relationship between the ratio of changed saturation and the hue of the corresponding sample.

BRIEF DESCRIPTION OF THE DRAWINGS

For a better understanding of the present invention and to understand how the same may be brought into effect, the invention will now be described by way of example only, with reference to the appended drawings in which.

DESCRIPTION OF THE PREFERRED EMBODIMENT

Figure 1:
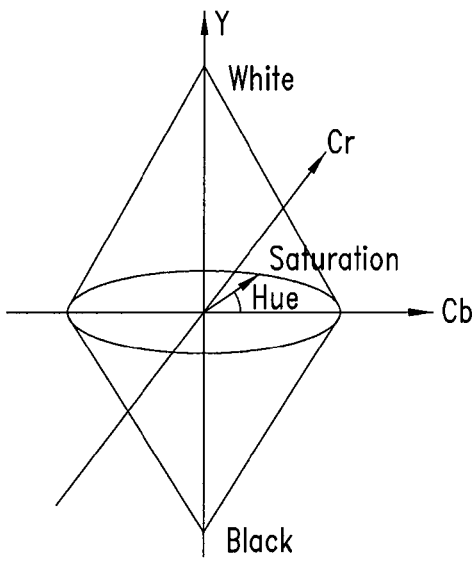
FIG. 1 shows a representation of YCbCr colour space.
Figure 2:
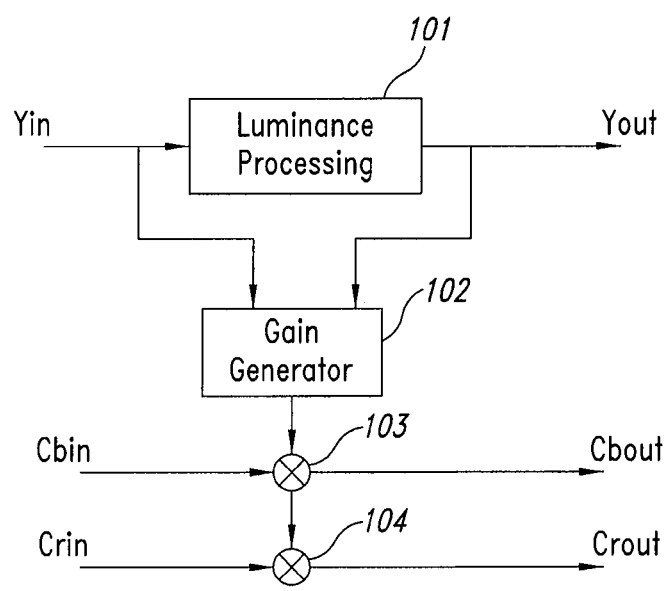
FIG. 2 shows a prior art approach to chrominance saturation compensation.
Figure 3:
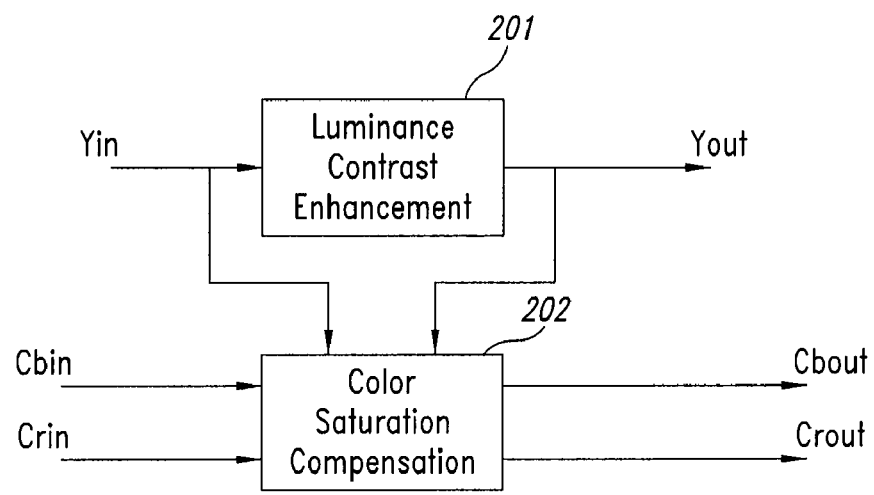
FIG. 3 shows an overview of an embodiment of the invention.

FIG. 3 shows a general overview of an embodiment of the present invention. This embodiment utilises the chrominance and modified luminance signals to enhance the chrominance saturation. The input luminance signal $Y_{in}$ is received by the luminance contrast enhancement circuit or process 201 and modified according to known luminance enhancement techniques. Such techniques may include using a luminance mapping function to enhance the luminance signal. The skilled man will be aware of such techniques. The modified luminance signal, $Y_{out}$, is the output from circuit or process 201. FIG. 3 also shows a colour saturation compensation circuit or process 202, which receives as inputs $Y_{in}$ and $Y_{out}$ as well as the chrominance input signals $Cr_{in}$ and $Cb_{in}$.

The colour saturation compensation circuit or process may be arranged as a hardware circuit in custom or general circuitry, or may be arranged to operate a software process on a suitably programmed or configured processor, such as a DSP.

Circuit or process 202 operates on its 4 input signals to create two output signals $Cb_{out}$ and $Cr_{out}$ which are colour saturation compensated chrominance signals. The output chrominance signals are essentially generated by multiplying the input chrominance signals with a hue-based compensation gain, the derivation of which is described here.

At an overview level, the present invention may be described by the following equations:

$$Cb_{out} = CGain * Cb_{in} \qquad (1)$$

$$Cr_{out} = CGain * Cr_{in} \qquad (2)$$

CGain is the compensation gain which may, in turn, be represented by the equation:

$$CGain = Weight(hue) * Y_{out}/Y_{in} \qquad (3)$$

Weight(hue) is the hue-based weighting factor, the derivation of which will shortly be described.

As a result of the luminance enhancements performed on the luminance signal, the resulting colour saturation can be acceptable, over-saturated or de-saturated. Embodiments of the present invention seek to address the problems caused by over-saturation and de-saturation.

In the case of de-saturation, the compensation gain is limited in the range of:

$$1.0 < CGain < MaxGain$$

where MaxGain is the maximum allowable compensation gain.

In the case of over-saturation, the compensation gain is limited in the range of:

$$0 < CGain < 1.0$$

In order to take advantage of perceptional differences in colour saturation as it applies to different hues, a hue-based weighting factor, Weight(hue), is derived to improve compensation gain according to the hue of a given sample. Different colours have different ratios of changed saturation when their luminance changes. In this context, the ratio of changed saturation is defined as the ratio of colour saturation after luminance processing to colour saturation before luminance processing.

Figure 4:
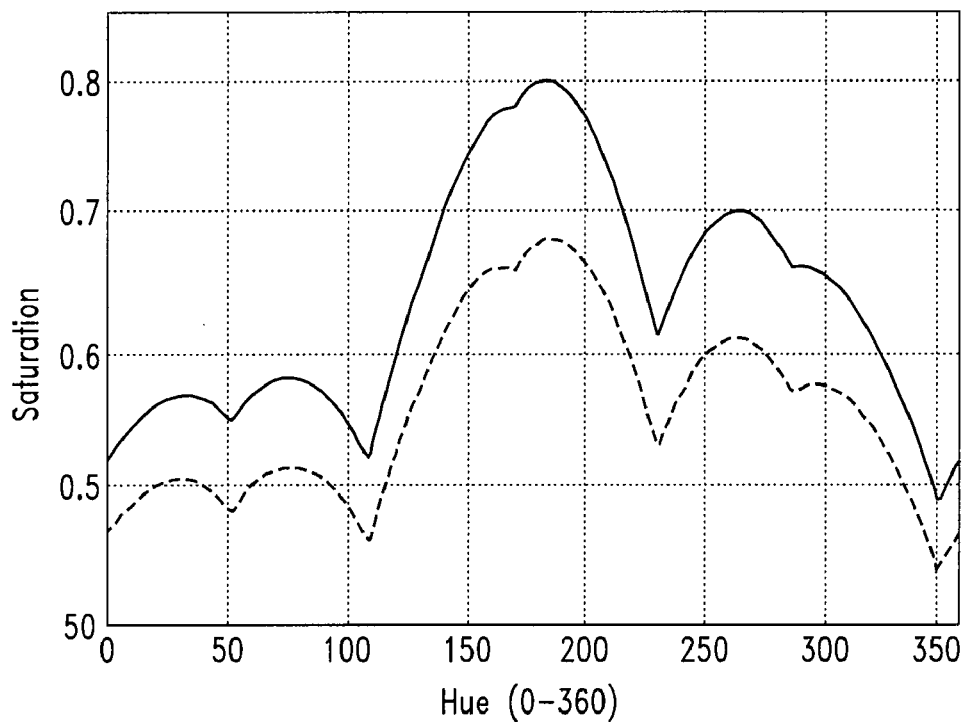
FIG. 4 shows a graph plotting chrominance saturations at two luminance values.
Figure 5:
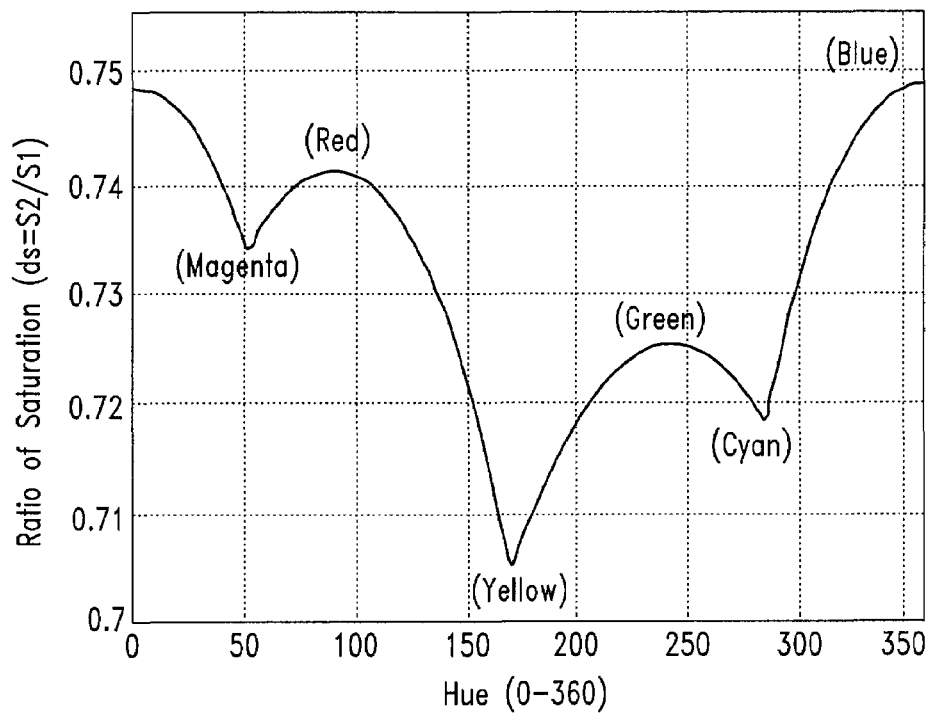
FIG. 5 shows a graph plotting the relationship between ratios of changed saturations and hue.

FIGS. 4 and 5 are intended to illustrate the relationship between the ratios of changed saturation and hue in a particular example. FIG. 4 shows Hue as a value (0–360) on the x-axis, and saturation on the y-axis. The graphs show two lines representing different saturation values for a given hue, for different luminance values. The dashed line represents a larger luminance value than the solid line. It can be seen from FIG. 4 that for a fixed luminance value, different hues have different saturations. When the luminance value of a colour increases, its saturation decreases, as can be inferred by the dashed line sitting below the solid line in FIG. 4.

FIG. 5 shows a curve plotting ratio of saturations on the y-axis against Hue on the x-axis. This curve illustrates that when the luminance is changed, its saturation will be changed, but that the ratio of changed saturation is dependent on the particular hue. For instance, in this example, the ratio of changed saturation of 'red' (hue=100) is larger than the ratio of changed saturation of 'yellow' (hue=177). For this reason, different compensation gains are required for different hues.

Embodiments of the present invention provide a hue-based weighting function, fweight(hue), which relates a particular hue to a corresponding weighting factor. The function is derived from the curve of the relationship between the ratio of changed saturation and hue, as is shown in FIG. 5.

Figure 6:
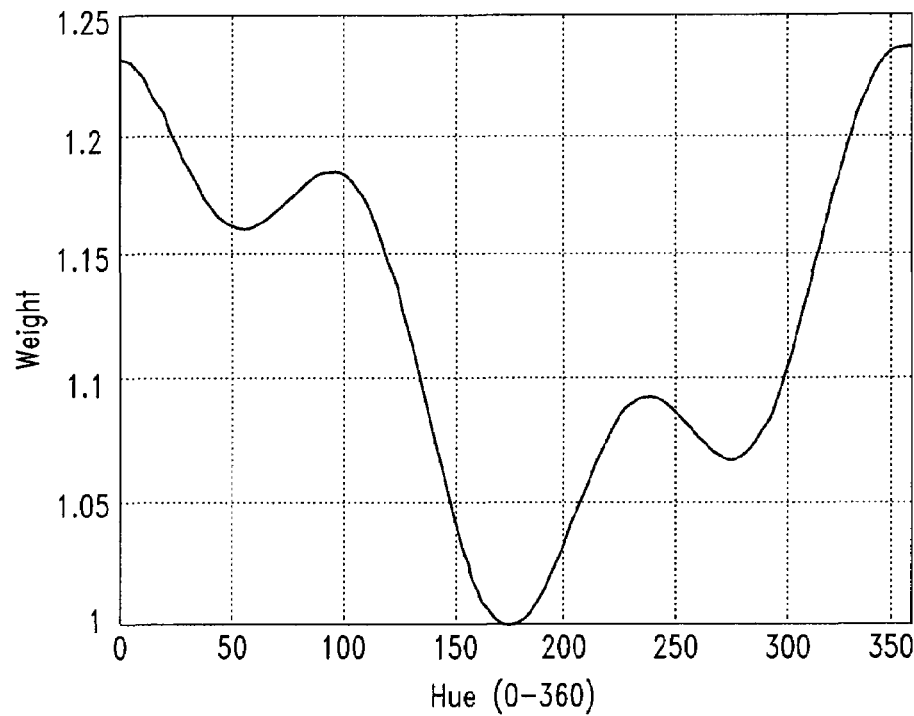
FIG. 6 shows a plot of a hue-based weighting function.

FIG. 6 shows an example of the function curve using certain experimental values. The final weighting factor can be adjusted by a user-defined parameter WGain. The adjusted weighting factor is described by the following equation:

$$\text{Weight(hue)} = \text{WGain} * (\text{fweight(hue)} - 1) + 1 \quad (4)$$

Figure 7:
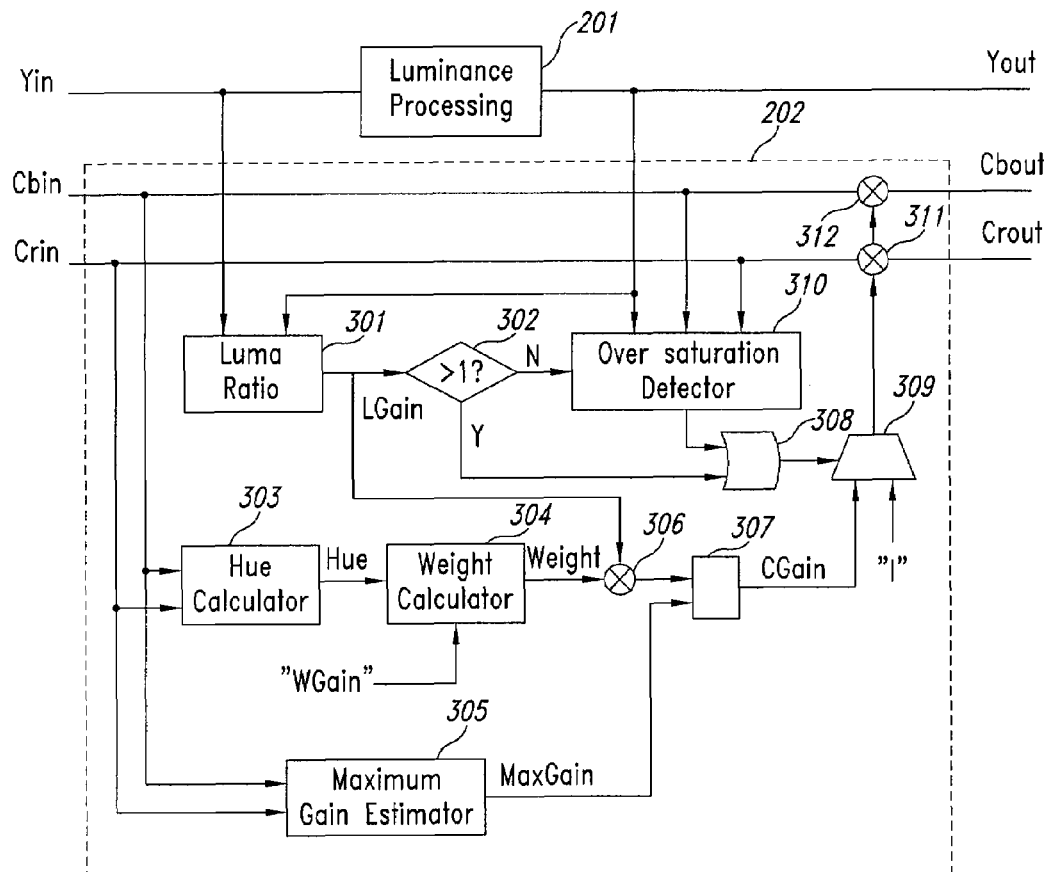
FIG. 7 shows a functional block diagram of the present invention.

FIG. 7 shows a detailed view of an embodiment of the invention. It's main feature is an enhanced detailed view of the colour saturation compensation block 202 of FIG. 3, which is shown within the dotted box.

The embodiment of FIG. 7 receives three input signals: $Y_{in}$, $Cb_{in}$ and $Cr_{in}$. It generates three output signals: $Y_{out}$, $Cb_{out}$ and $Cr_{out}$. The luminance processing is performed by circuit or process 201.

A circuit entitled 'Luma Ratio' 301 is provided which receives as inputs $Y_{in}$ and $Y_{out}$. It is operable to divide $Y_{out}$ by $Y_{in}$ to yield LGain, which is the luminance ratio. This ratio, LGain is compared in comparator 302 with '1'. If LGain is larger than '1' then the luminance has increased, and colour saturation has consequentially decreased. If LGain is less than '1' then the luminance has decreased, and over saturation detector 310 is used to determine whether the colour is over-saturated or not.

An OR gate 308 is provided which is operable to select an input of multiplexer 309. OR gate 308 is arranged to output a '1' in the event that LGain is >1 and the colour is de-saturated or if LGain is <1 and over-saturation is detected. In either of, these events, the input chrominance signals will require compensation.

The compensation signal CGain is applied to a first input of the multiplexer 309, and '1' is applied to the other input. If the output of OR gate 308 is 1, then the CGain input of the multiplexer 309 is selected. This has the effect of applying the CGain signal to multipliers 311, 312 which each act on the input chrominance signals to produce the output chrominance signals.

If the output of OR gate 308 is '0', then the '1' input to multiplexer 309 is selected, applying '1' to the multipliers 311, 312, with the net effect that the output chrominance signals are unchanged from the input signals.

The over-saturation detector 310 is operable to detect whether a particular colour sample is over-saturated or not, If the value of the sample's saturation is >1 then the colour is over-saturated. Otherwise, the colour is not over-saturated. The degree of colour saturation can be calculated in RGB space according to the following equation:

$$\text{Saturation} = (\text{Max}(R, G, B) - \text{Min}(R, G, B))/\text{Max}(R, G, B) \quad (5)$$

where R, G and B are red green and blue signals respectively. To convert YCbCr signals to RGB signals, the following equations may be used:

$$\left. \begin{array}{l} R = Y + 1.366 * Cr \\ G = Y - 0.700 * Cr - 0.334 * Cb \\ B = Y + 1.732 * Cb \end{array} \right\} \quad (6)$$

Since the value of Max(R, G, B) in (5) is always positive, the detection of over saturation can be carried out by detecting the sign bit of Min(R, G,. B). If it is negative, then the saturation value is >1 and the colour is over-saturated. If the sign bit is positive, then the colour is not over saturated.

Figure 8:
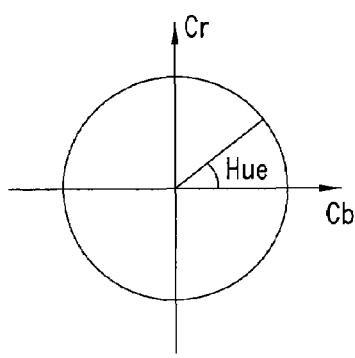
FIG. 8 shows the relationship between chrominance components and hue.

In order to calculate CGain for a particular hue, it is necessary to calculate a hue value from the input chrominance components. Hue calculator 303 receives as inputs $Cb_{in}$ and $Cr_{in}$. Using Cartesian components, the hue is related to the chrominance components as shown in FIG. 8. Cb and Cr are shown as mutually perpendicular axes. The hue is given by the phase angle of the chrominance vector, with respect to the Cb axis, as shown. The magnitude of the vector in combination with the luminance is a measure of the colour saturation. The hue can be calculated using the following equation:

$$\text{Hue} = \tan^{-1}(Cr/Cb) \quad (7)$$

where $\tan^{-1}$ is the arctan function. Equation (7) returns the real inverse tangent of Cr/Cb in the range 0 to 360° using the signs of both arguments to determine the quadrant of the returned value. Normally, for an inverse tangent function, $\tan^{-1}(x)$, when its independent variable, x, is ranged from 0 to 1, the function can be approximated by a linear function: $\tan^{-1}(x) \approx x * 180/\pi$ and is ranged from 0 to 45°.Thus, the required angular information can be extracted from the quotient defined by |Cr|/|Cb| (when |Cr|<|Cb|), or |Cb|/|Cr| (when |Cr|>|Cb|) combined with the sign information from Cr and Cb.

Figures 9, 10:
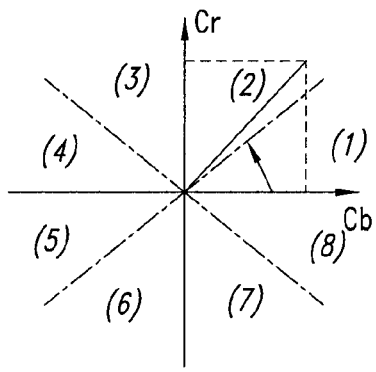
FIG. 9 shows eight defined regions in CbCr space.
FIG. 10 shows a table detailing the eight regions of FIG. 9 together with their sign values and hue calculations.

According to this, the the four quadrants of CbCr colour space can be divided into 8 regions of 45°. Each region can be identified by the sign bits of Cb, Cr and (|Cb|–|Cr|). The hue angle in each region can be defined by the quotient of |Cr|/|Cb| (when |Cr|<|Cb|), or |Cb|/|Cr| (when |Cr|>|Cb|). For example, in FIG. 9, region (1) is defined by Cb and Cr both being positive with |Cb|>|Cr|. The quotients of |Cr|/|Cb| correspond to the tangents of angles from 0 to 45°. As the chrominance signals move into region (2), |Cb|<|Cr| and Cb and Cr remain positive. The quotients of |Cb|/|Cr| correspond to the angles from 0 to 45° with respect to the +Cr axis.

Similarly, as the chrominance signals traverse each quadrant, the values represented by the quotients correspond to angles in the range 0 to 45° to 0, because only the magnitudes of Cb and Cr are applied to the divider and the smaller value is always divided by the larger. The table of FIG. 10 indicates the regions, the range of hue angles, the quotient values, the sign bits of Cb and Cr and |Cb|–|Cr| samples in the respective regions. In the Sign column, '0' represents positive and '1' represents negative. The final column, 'Hue', illustrates a simple method of determining hue from the sign bits and the quotient values.

Figure 11:
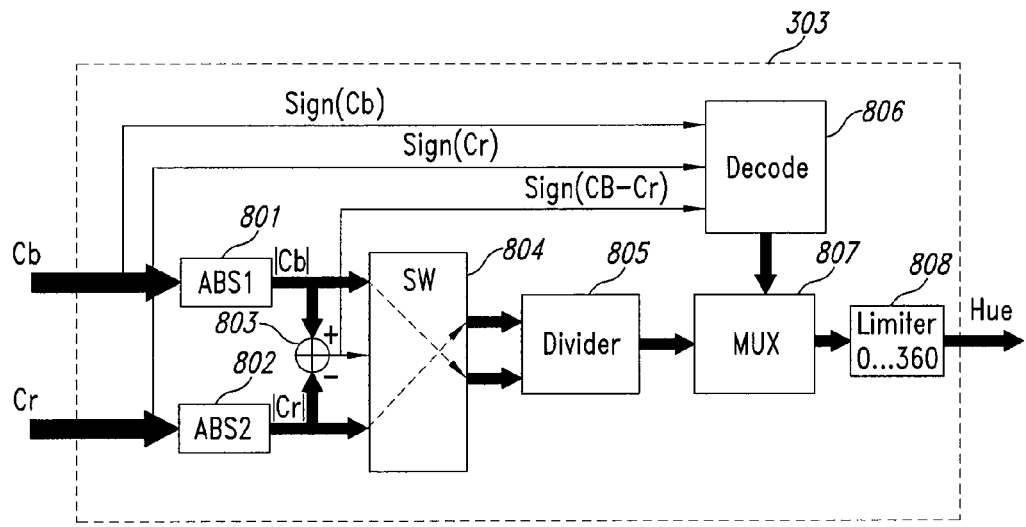
FIG. 11 shows a block diagram of the internal structure of a hue estimator.

FIG. 11 shows a schematic of the internal structure of the hue calculator 303 shown in FIG. 7. The chrominance input signals $Cb_{in}$ and $Cr_{in}$ are respectively applied to absolute value circuits 801, 802 which output only the magnitude of the input signals. |Cb|, the output of circuit 801 is passed to subtraction circuit 803 as subtrahend. |Cr|, the output of circuit 802 is passed to subtraction circuit 803 as minuend. The output of circuit 803 equals the difference between the two input signals, i.e. |Cb|=|Cr|. The sign bit of the calculation indicates which input signal to the subtractor 803 has the largest magnitude.

Switching circuit 804 receives |Cb| and |Cr| as major inputs and a signal indicative of the sign of |Cb|-Cr| as a control input. The control input ensures that the switch is operative such that the larger input signal is always directed to the following divider circuit 805 as divisor, and the smaller input signal is always directed to the divider circuit 805 as dividend.

Figure 12:
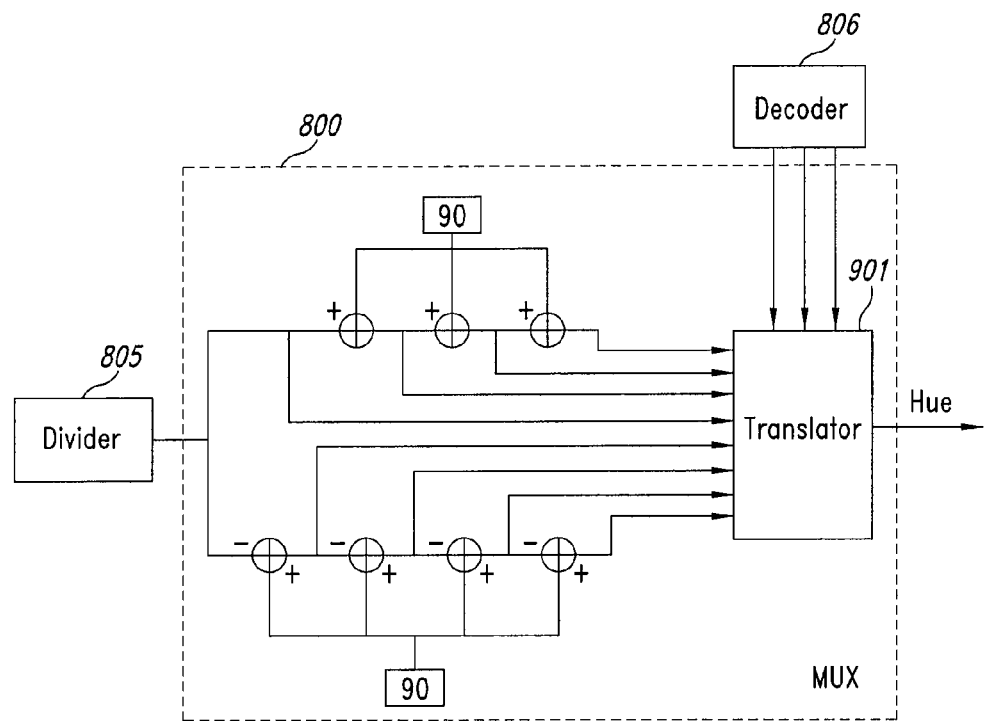
FIG. 12 shows a block diagram of the internal structure of the multiplexer of FIG. 11.

Divider circuit 805 acts on its input signals to generate a quotient value which is input to a multiplexer 807. The internal construction of multiplexer 807 is shown in FIG. 12. The multiplexer 807 receives as an input the output of the divider 805. This input signal is augmented in multiple adder units to generate a series of possible angle values which are all fed into translator 901, which is in effect a further multiplexer. The control inputs to translator 901 are derived from three digital signals representing the signs of Cb, Cr and |Cb|-|Cr|. These sign bits are decoded in logic decoder 806 to create the three control bits required to select one of the eight inputs to translator 901. In effect, the circuit of FIG. 12 puts the results of the table of FIG. 10 into effect.

The output of multiplexer 807 is fed into a limiter 808 to ensure that the eventual Hue output is limited in the range 0 to 360.

Figures 13, 14:
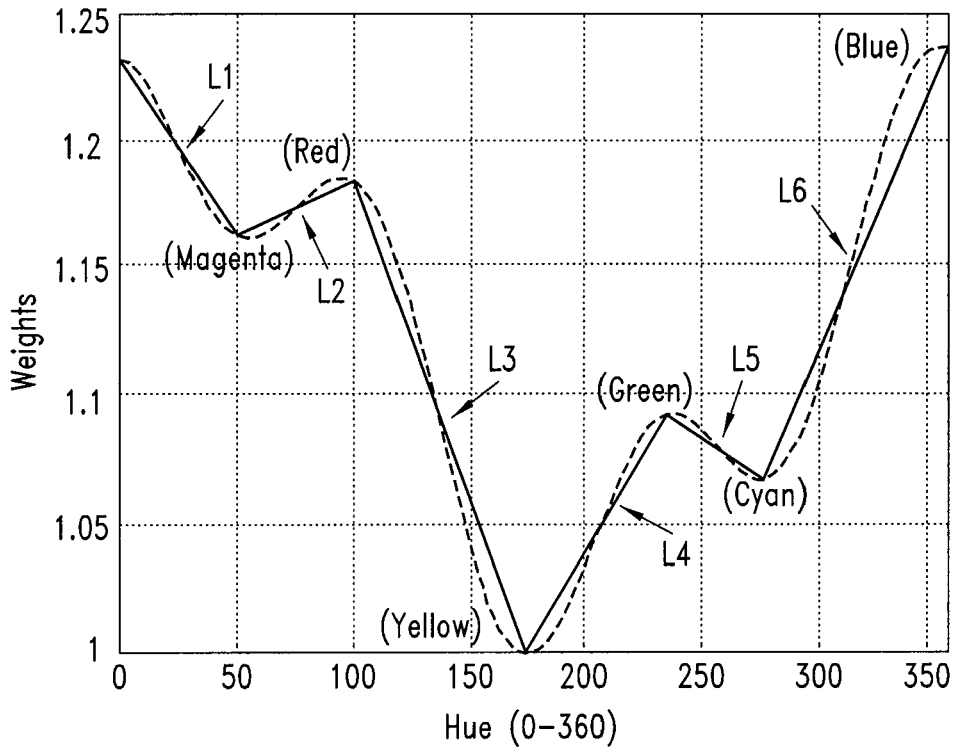
FIG. 13 shows the linear approximation of the weighting function as six individual line segments.
FIG. 14 shows a table listing the gradients and offsets for the six lines of FIG. 13.

Referring to FIG. 7, the output of the Hue calculator 303 is next passed to a Weight Calculator 304 which has as a further input WGain. Weight calculator 304 implements weighting function, fweight(hue). As can be seen from FIG. 6, fweight(hue) is a non-linear function which has 360 independent variables. To avoid the hardware complexity required by using a look up table to store all results for all 360 variables, the non-linear function is approximated using six line segments. The approximation is shown in FIG. 13. Each line in the approximation is defined by the equation:

$$\text{fweight(hue)}=K*\text{hue}+B \quad (8)$$

where K is the gradient of the line and B is the offset.

The parameters of the six lines (L1–L6) are shown in the table in FIG. 14. Using the function's value fweight(hue) and user-defined WGain, the hue based weight(hue) can be calculated using equation (4).

The ideal compensation gain CGain is obtained by multiplying the adjusted weight, weight(hue), by the luminance gain, LGain, at multiplier 306. The maximum gain estimator 305 is arranged to output a maximum allowable gain, MaxGain, to limit the range of the compensation gain which may be applied. This avoids any danger of colour change. In an 8-bit digital system, chrominance signals are defined to have a range of 16–240, with 128 being equal to 0. The maximum value of the chrominance components is 112. Thus, MaxGain can be defined by the equation:

$$\text{MaxGain}=112/\max(abs(Cb_{in}), abs(Cr_{in})) \quad (9)$$

where max(abs($Cb_{in}$), abs($Cr_{in}$)) is the maximum value of (abs($Cb_{in}$) and abs($Cr_{in}$), and (abs($Cb_{in}$) and abs($Cr_{in}$) are the absolute values of $Cb_{in}$ and $Cr_{in}$ respectively.

Embodiments of the present invention may be realised in software using a suitable programmed processor, especially a DSP. Alternatively, embodiments may be realised in hardware using either discrete components or, preferably, a custom integrated circuit, such as an ASIC.

The present invention includes and novel feature or combination of features disclosed herein either explicitly or any generalisation thereof irrespective of whether or not it relates to the claimed invention or mitigates any or all of the problems addressed.

The invention claimed is:

1. A method of colour saturation compensation in a video signal, including the steps of:
    processing an input luminance signal component of the video signal to generate an output luminance signal component;
    determining whether the processing of the input luminance signal component results in a change in chrominance saturation;
    generating a compensation signal based upon a hue and a luminance ratio equal to the output luminance signal component divided by the input luminance signal component; and
    if the step of determining reveals that the chrominance saturation has changed, applying the compensation signal to chrominance signals components of the video signal to counteract the effects of the chrominance saturation change.

2. The method of claim 1, wherein said hue is determined according to the relationship:

$$\text{hue}=\tan^{-1}(Cr_{in}/Cb_{in})$$

where $Cr_{in}$ and $Cb_{in}$ are the chrominance signal components of the video signals.

3. The method of claim 2, wherein the hue may be approximated by the following steps:
    dividing the smaller of the absolute value of the $Cr_{in}$ and $Cb_{in}$ components by the larger of the absolute value of the $Cr_{in}$ and $Cb_{in}$ components to generate a quotient input signal;
    determining in which of eight 45° regions of CbCr space the $Cr_{in}$ and $Cb_{in}$ components reside by processing a sign bit of the $Cb_{in}$ component, a sign bit of the $Cr_{in}$ component, and a sign bit of the difference between the absolute values of the $Cb_{in}$ component and the absolute value of the $Cr_{in}$ component; and
    limiting the approximated hue to lie in a range of 0 to 360 as a valid hue.

4. The method of claim 3, wherein the quotient input signal is augmented to generate a plurality of possible hues, the approximated hue selected from the plurality of possible hues based upon the sign bit of the $Cb_{in}$ component, the sign bit of the $Cr_{in}$ component, and the sign bit of (|$Cb_{in}$|–|$Cr_{in}$|).

5. The method of claim 1, wherein generating the compensation signal further includes calculating a weighting factor for the hue, said weighting factor being multiplied by the luminance ratio to yield the compensation signal.

6. The method of in claim 5, wherein said compensation signal is constrained so as not to exceed a maximum allowable gain.

7. The method of claim 5, wherein calculating the weighting factor includes calculating the weighting factor based upon a linear approximation to a non-linear weighting function.

8. The method of claim 7, wherein the linear approximation takes the form of a plurality of line segments defining a relationship between a variable hue and a value of the weighting function.

9. The method of claim 8, wherein the plurality of line segments includes six discrete line segments relating the variable hue to the value of the weighting function according to the following table:

| Line Segment | Hue range | Gradient | Offset |
|---|---|---|---|
| L1 | 0–52 | −0.0014 | 1.2314 |
| L2 | 53–100 | +0.0002 | 1.1525 |
| L3 | 101–177 | −0.0028 | 1.4797 |
| L4 | 178–235 | +0.0015 | 0.7513 |
| L5 | 236–280 | −0.0003 | 1.1637 |
| L6 | 281–360 | +0.0023 | 0.4163 |

10. The method of claim 5, wherein the weighting factor may be modified by an amount determined by a user-defined quantity.

11. An apparatus configured to compensate colour saturation in a video signal, comprising:
means for processing an input luminance signal component of the video signal to generate an output luminance signal component;
means for determining whether the processing of the input luminance signal component results in a change in chrominance saturation;
means for generating a compensation signal based upon a hue and a luminance ratio, the luminance ratio equal to the output luminance signal component divided by the input luminance signal component; and
if the means for determining reveals that the chrominance saturation has changed, means for applying the compensation signal to chrominance signal components of the video signal to counteract the effects of the chrominance saturation change.

12. The apparatus of claim 11, including a processor.

13. The apparatus of claim 12, wherein the processor is a Digital Signal Processor (DSP).

14. The apparatus of claim 11, including a custom integrated circuit such as an ASIC.

15. A colour saturation compensation circuit for compensating chrominance signals based upon a hue-based weighting factor, comprising:
a hue calculator configured to determine a hue, based upon a sign bit of a first chrominance signal, a sign bit of a second chrominance signal, a sign bit of an absolute value of the second chrominance signal subtracted from an absolute value of the first chrominance signal, and a chrominance quotient; and
a weight calculator configured to determine the hue-based weighting factor based upon the hue and a hue-based weighting function.

16. The colour saturation compensation circuit of claim 15, wherein the chrominance quotient is the absolute value of the second chrominance signal divided by the absolute value of the first chrominance signal if the absolute value of the second chrominance signal is less than the absolute value of the first chrominance signal, or the absolute value of the first chrominance signal divided by the absolute value of the second chrominance signal if the absolute value of the first chrominance signal is less than the absolute value of the second chrominance signal.

17. The colour saturation compensation circuit of claim 15, further comprising:
a luma ratio module configured to determine an luminance gain based upon an input luminance signal and an output luminance signal;
an oversaturation detector configured to determine if colour saturation of a video signal is over-saturated, the video signal comprised of the output luminance signal, the first chrominance signal, and the second chrominance signal; and
a first multiplier configured to multiplying the luminance gain and the hue-based weighting factor to determine a compensation gain.

18. The colour saturation compensation circuit of claim 17, further comprising:
a second multiplier configured to multiply, when the colour saturation of the video signal is over-saturated, the first chrominance signal and the compensation gain to generate a compensated first chrominance signal; and
a third multiplier configured to multiply, when the colour saturation of the video signal is over-saturated, the second chrominance signal and the compensation gain to generate a compensated second chrominance signal.

19. A method for compensating chrominance signals based upon a hue-based weighting factor, comprising:
determining a hue, based upon a sign bit of a first chrominance signal, a sign bit of a second chrominance signal, a sign bit of an absolute value of the second chrominance signal subtracted from an absolute value of the first chrominance signal, and a chrominance quotient; and
determining the hue-based weighting factor based upon the hue and a hue-based weighting function.

20. The method of claim 19, wherein the chrominance quotient is the absolute value of the second chrominance signal divided by the absolute value of the first chrominance signal if the absolute value of the second chrominance signal is less than the absolute value of the first chrominance signal, or the absolute value of the first chrominance signal divided by the absolute value of the second chrominance signal if the absolute value of the first chrominance signal is less than the absolute value of the second chrominance signal.

21. The method of claim 19, further comprising:
determining an luminance gain based upon an input luminance signal and an output luminance signal;
determining if colour saturation of a video signal is over-saturated, the video signal comprised of the output luminance signal, the first chrominance signal, and the second chrominance signal; and
determining a compensation gain by multiplying the luminance gain and the hue-based weighting factor.

22. The method of claim 21, further comprising:
if the colour saturation of the video signal is over-saturated, generating a compensated first chrominance signal by multiplying the first chrominance signal and the compensation gain; and
if the colour saturation of the video signal is over-saturated, generating a compensated second chrominance signal by multiplying the second chrominance signal and the compensation gain.

23. A colour saturation compensation circuit for compensating chrominance signals based upon a hue-based weighting factor, comprising:
a means for determining a hue, based upon a sign bit of a first chrominance signal, a sign bit of a second chrominance signal, a sign bit of an absolute value of the second chrominance signal subtracted from an absolute value of the first chrominance signal, and a chrominance quotient; and
a means for determining the hue-based weighting factor based upon the hue and a hue-based weighting function.

24. A colour saturation compensation system configured to receive two input chrominance components of an input video signal, an input luminance component of the input video signal, and a processed luminance component of an output video signal, and to compensate the two input chrominance components to generate two output chrominance components of the output video signal, comprising:

a luma ratio module configured to process the input luminance component and the processed luminance component to determine a luminance ratio;

an over-saturation detector configured to process the input chrominance components and the processed luminance component to determine if colour saturation of a colour sample is over-saturated, the colour sample comprised of the input chrominance components and the processed luminance component;

a hue calculator configured to process the input chrominance components of the input video signal to generate a hue;

a weight calculator configured to process the hue to generate a hue-based weight;

a first multiplier configured to multiply the hue-based weight and the luminance ratio to generate a compensation signal; and a second multiplier to multiply the input chrominance components of the input video signal and the compensation signal to generate the two output chrominance components of the output video signal, if the colour saturation of the colour sample is over-saturated.

\* \* \* \* \*

UNITED STATES PATENT AND TRADEMARK OFFICE
CERTIFICATE OF CORRECTION

| | |
|---|---|
| PATENT NO. | : 7,193,659 B2 |
| APPLICATION NO. | : 10/847205 |
| DATED | : March 20, 2007 |
| INVENTOR(S) | : Yong Huang et al. |

Page 1 of 1

It is certified that error appears in the above-identified patent and that said Letters Patent is hereby corrected as shown below:

<u>Column 8</u>
Line 53, "The method of in claim 5" should read as -- The method of claim 5 --

Signed and Sealed this

Tenth Day of June, 2008

JON W. DUDAS
*Director of the United States Patent and Trademark Office*